(12) United States Patent
Singh et al.

(10) Patent No.: US 9,916,155 B2
(45) Date of Patent: Mar. 13, 2018

(54) PROJECTS BROWSER FOR DEVELOPMENT ENVIRONMENTS

(71) Applicant: International Business Machines Corporation, Armonk, NY (US)

(72) Inventors: Awanish K. Singh, Gurgaon (IN); Jaspreet Singh, Rohini (IN)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 14/955,201

(22) Filed: Dec. 1, 2015

(65) Prior Publication Data
US 2017/0153886 A1   Jun. 1, 2017

(51) Int. Cl.
G06F 9/44 (2006.01)

(52) U.S. Cl.
CPC .................. *G06F 8/70* (2013.01); *G06F 8/71* (2013.01); *G06F 9/4443* (2013.01)

(58) Field of Classification Search
CPC ...................................................... G06F 8/20
See application file for complete search history.

(56) References Cited

U.S. PATENT DOCUMENTS

| | | | |
|---|---|---|---|
| 8,046,717 B1 | 10/2011 | Goel et al. | |
| 8,407,180 B1 | 3/2013 | Ramesh et al. | |
| 8,631,390 B2 | 1/2014 | Cox, III et al. | |
| 2007/0256054 A1* | 11/2007 | Byrne | G06F 8/73 717/113 |
| 2008/0270974 A1* | 10/2008 | Topchiyski | G06F 8/60 717/104 |
| 2013/0219365 A1* | 8/2013 | Rago | H04L 63/08 717/125 |
| 2013/0247004 A1 | 9/2013 | DeLuca et al. | |
| 2015/0121341 A1 | 4/2015 | Grant et al. | |
| 2015/0128017 A1 | 5/2015 | Fithian et al. | |
| 2015/0154361 A1* | 6/2015 | Barsoum | G06F 19/322 705/3 |

OTHER PUBLICATIONS

Pash, A., "View your history in thumbnails with ThumbStrips", Lifehacker, Posted Jun. 28, 2007, 3 pages. Last printed Aug. 31, 2015. http://lifehacker.com/273208/view-your-history-in-thumb-nails-with-thumbstrips?commerce_insets_disclosure=on&utm_expid=66866090-48.Ej9760cOTJCPS_Bq4mjoww.2.

* cited by examiner

*Primary Examiner* — Hang Pan
(74) *Attorney, Agent, or Firm* — Laura E. Gisler (57) ABSTRACT

Projects may be recalled by a system based on a selection of a screenshot associated with the project. A request to access a project, by a selection of a screenshot from a group of screenshots may be received. The screenshot may be mapped to a particular workspace location, and it may be associated with trace data stored in a file. The associated trace data may be identified by the system, and the trace data can be read. Using the trace data, the system can access the project associated with the screenshot and launch the workspace and the project.

15 Claims, 5 Drawing Sheets

PROJECTS BROWSER FOR DEVELOPMENT ENVIRONMENTS

BACKGROUND

The present disclosure relates to integrated development environments (IDE), and more specifically, to accessing past work in an IDE.

An IDE is a software application that provides comprehensive facilities to computer programmers for software development. An IDE may consist of a source code editor, build automation tools, and a debugger. The various sets of tools provided by the IDE may speed up development. IDEs may improve development by providing components with similar user interfaces, as a single program, in which all the development may be done. The IDE may provide features for manipulating and developing code including authoring, modifying, compiling, deploying, and debugging software.

SUMMARY

Embodiments of the present disclosure may be directed toward a method for receiving a request to access a project by a selection of a particular screenshot of the project from a set of screenshots. The particular screenshot of the project may have been captured in response to a developer selection. The particular screenshot may be mapped to a particular workspace location, and the particular screenshot may be associated trace data with an extensible markup language (XML) file. The XML file associated with the particular screenshot may be identified in response to the request. The associated trace data can then be read from the XML file, and an IDE workspace associated with the screenshot may be accessed from the workspace location specified by the trace data. The IDE workspace containing the project can then be launched.

Embodiments of the present disclosure may be directed toward a system with a computer readable storage medium with program instructions stored thereon and a processor configured to execute the program instructions to perform steps for receiving a request to access a project by a selection of a particular screenshot of the project from a set of screenshots. The particular screenshot of the project may have been captured in response to a developer selection. The particular screenshot may be mapped to a particular workspace location, and the particular screenshot may be associated trace data within an extensible markup language (XML) file. The trace data associated with the particular screenshot in the XML file may be identified in response to the request. The associated trace data can then be read from the XML file, and an IDE workspace associated with the screenshot may be accessed from the workspace location specified by the trace data. The IDE workspace containing the project can then be launched.

Embodiments of the present disclosure may be directed toward a computer program product with a computer readable storage medium with program instructions embodied therewith, where the computer readable storage medium is not a transitory signal per se. The program instructions may be executable by a computer processor to cause the processor to perform steps including receiving a request to access a project by a selection of a particular screenshot of the project from a set of screenshots. The particular screenshot of the project may have been captured in response to a developer selection. The particular screenshot may be mapped to a particular workspace location, and the particular screenshot may be associated trace data which can be stored within an extensible markup language (XML) file. The trace data associated with the particular screenshot, stored in the XML file may be identified in response to the request. The associated trace data can then be read from the XML file, and an IDE workspace associated with the screenshot may be accessed from the workspace location specified by the trace data. The IDE workspace containing the project can then be launched.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to an IDE, and more particular aspects relate to recalling past projects within an IDE. While the present disclosure is not necessarily limited to such applications, various aspects of the disclosure may be appreciated through a discussion of various examples using this context.

In software development, a developer may user an IDE to develop and manage an application or applications. An IDE may provide various sets of tools that may help to speed up development, or assist a developer in adhering to a set of best practices. Within an IDE, various workspaces may be used to develop and manage different projects and applications. A workspace may hold various projects, may be given a particular name by a developer, and may also be stored at a particular location that can be accessed using a workspace path.

Over time, a number of different workspaces and projects may accumulate on a particular machine, server, or memory. A project management tool may be used which may include the use of naming conventions to logically segregate workspaces from one another. However, recalling a particular project within a workspace may be more difficult, as particular workspaces contain multiple projects, and standard project names alone may not convey enough information to identify various aspects of the project.

Various embodiments are directed toward a computer system that can use screenshot captures to assist in the recall of projects in an IDE, using thumbnails of screenshots of visual representations of the projects and workspaces. As discussed in detail herein, the screenshots can be based on one or more views selected by the developer or by default, and may be used to access the associated project.

According to embodiments, the computer system can be configured to receive a request to access a particular past project, based on a selection of a particular screenshot from a set of screenshots. In response to the selection of the particular screenshot within the system, a project that was associated with the screenshot, and of which the screenshot was taken, including its source code and configurations, can be loaded onto a user's device. For example, a developer can make this selection by double-clicking on the file image or file name, or in another way that indicates that the particular screenshot is the desired file to be opened. The particular screenshot may have been captured and saved in response to a selection by a developer working within the IDE. It may also have been captured and saved automatically, based on a user setting and in response to, for example, a user saving the project on the user device; the screenshot may include a selection of artifacts associated with the project of which the screenshot is captured. For example, these artifacts may include deployment descriptor files, source code, or other data relevant to the project.

The screenshot may be saved in various ways, based on, for example, user or system administrator defined settings. For example, a user may select a particular view or configuration to be captured by clicking a "capture" button, using a keyboard shortcut, or in some other way. The screenshot may be given a name by default, for example a combination of the project name and selected view name, or it may be given a predefined name that may be set by the user prior to the capture or after the screenshot capture.

Thus the screenshot may be used by a developer or other user attempting to recall a particular project as a visual reminder of key aspects of the project. In embodiments, each screenshot in the set of screenshots may have been captured and saved in response to a developer's selection. For example, if the developer is working on a project that has a user interface (UI), and the IDE provides a visual representation of that UI in an editor view, the developer may choose to select for capture and save that view, as it may be helpful in later identifying the project the developer was working on at that time. As another example, a developer may be working on a project that does not have a UI. In this case, the developer may select a view of the project, like a class diagram or web flow diagram, which may help identify the project. For each of these options (e.g., a UI-based project and a non-UI-based project), the system may provide default options that can be customized based on user preference and project type. The frequency of the capture of a screenshot can be customized and performed at, for example, regular specified time intervals, tied to the save operation, or as a one-time-only capture. The screenshot or screenshots for each project can be saved at a particular location.

In embodiments, a screenshot for a project may be captured automatically based on preference settings. These preference settings may include screenshot capture intervals, where default values could be the save operation of selected views. For example, the developer could specify the screen capture intervals to minutes, based on user preference. Captured screenshots may be saved to a project catalog folder, or they may be saved to another location, based on user preference. The project catalog can be used to hold the captured screenshots.

In embodiments, at the first screenshot capture for a particular project, the system may also create mapping information that can be used to trace back to the particular project in any particular workspace location. This mapping information may be referred to as "trace data". This trace data may be stored in an extensible markup language (XML) file. The XML file may store the trace data for the entire system. One or more trace data entries may be created and updated within the system to reflect a particular screenshot or project. Thus, each screenshot may serve as a visual representation of source code and configurations in the project (e.g., artifacts), and the project can be recalled and loaded to the developer's IDE, based on the identification of the project through use of the trace data associated with the screenshot, stored in the XML file. While multiple screenshots may exist for a single project (as described in more detail herein), a single trace data entry may be associated with each project, and stored in an XML file. As discussed herein, the XML file may store trace data entries for all projects within a particular system. In some instances, this may result in a group of screenshots associated with a single trace data entry in the XML file, which then allows the system to trace back to a single project.

In response to receiving a selection of the particular screenshot, the system can identify the trace data associated with the particular screenshot in the XML file and the associated project from its location within the system. The system can then read, from the trace data in the XML file. Using this trace data, the system can access the project associated with the screenshot, and launch the project within the appropriate workspace.

Figure 1:
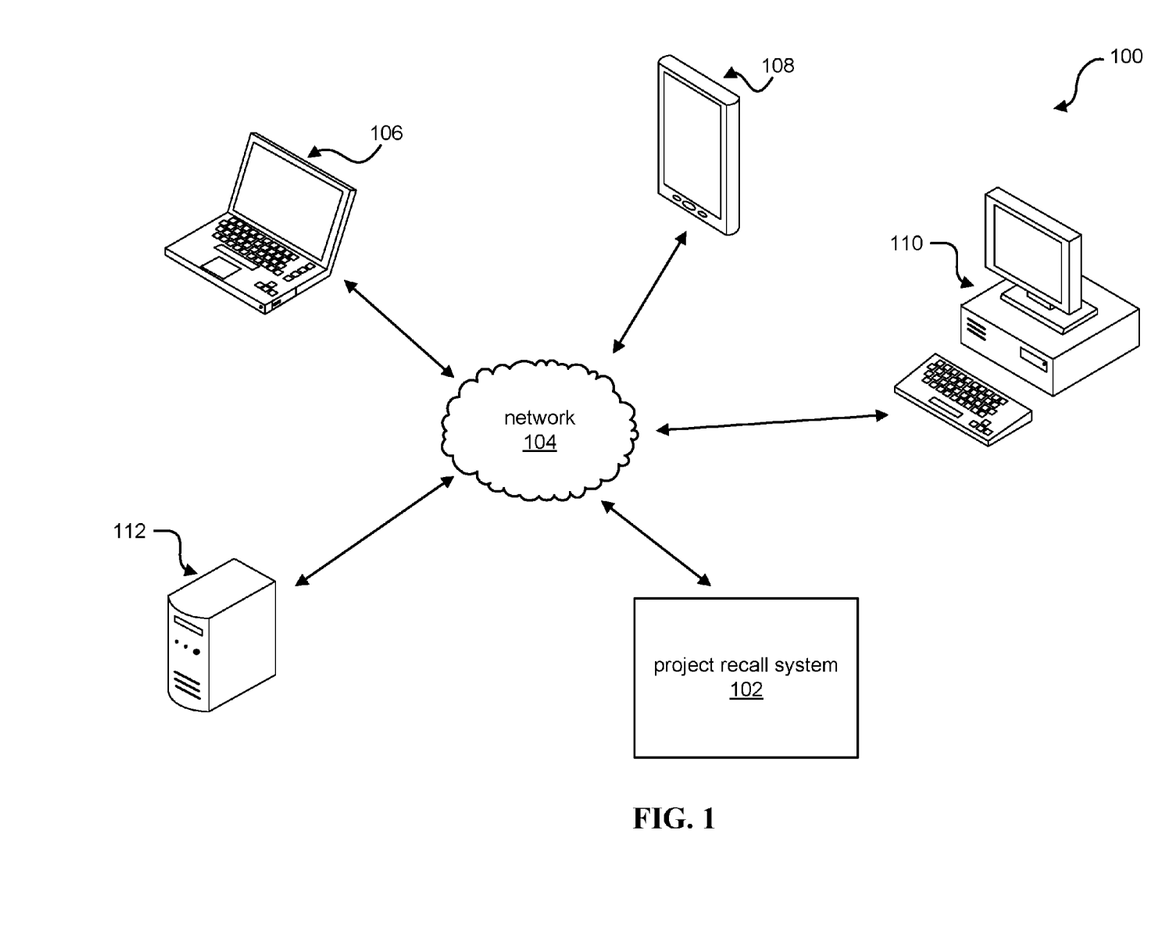
FIG. 1 depicts an example software development environment that may be used according to embodiments.

FIG. 1 depicts an example software development environment 100 that may be used according to embodiments. The software development environment 100 may comprise the following: one or more client devices 106, 108, and 110 used by for example, software developers, one or more servers 112 to provide applications and services to the client devices, and a network 104 connecting the client devices and the servers. The client devices 106-110 and the servers 112 may access one or more instances of a project recall system 102 running on the client devices. In some embodiments, project recall system 102 may be an independent system, as pictured in FIG. 1, which can communicate with client devices 106-110 and one or more servers 112 over a network 104. In other embodiments, the project recall system 102 may be embedded in a client device, for example, client device 106, and may run on the client device. In other embodiments, project recall system 102 may be hosted on a server 112 and may be accessed by client device 106. Data used by the project recall system 102 may be stored on the one or more servers 112, including, for example, a project catalog folder, workspace and project files, and/or xml files associated with the screenshots. The network 104 may be a local area network or an interconnected set of networks, such as the internet. The network 104 may enable communication between the client devices 106-110 and servers 112. The network 104 may be wired, wireless, or a combination thereof.

The client devices 106, 108, and 110 of the software development environment 100 may each directly access an instance of the project recall system 102. In embodiments, the client devices 106-110 may access an instance of the project recall system 102 indirectly. In some instances, the project recall system may operate within an integrated development environment (IDE), or another particular combination of software development tools. In embodiments, the project recall system may operate as an add-on to, or independently of, an IDE or other software development program.

The servers 112 may run an instance of the project recall system 102. The servers 112 may provide instances of the project recall system 102 to the client devices 106, 108, and 110. In some embodiments, the servers 112 may communicate with a data storage repository (not depicted) to store and files for the software development environment 100. In some embodiments, the client devices 106, 108, and 110 may run a part of an instance of the project recall system 102 and the servers 112 run another part of the instance.

In embodiments, a developer working on a client device, for example client device 106, may be working within an IDE, on a particular project. The project may be launched within a particular workspace, where the workspace has been modified to a particular configuration based on the specifics of the project. The developer working on client device 106 may access the project recall system 102, and save a selected view of the project as a screenshot. The screenshot can then be saved in a project catalog. The project catalog may be a part of the project recall system 102, or it may be communicatively coupled to and accessible by the project recall system 102. The project recall system 102 may, in response, create both a thumbnail view of the screenshot as well as an associated trace data from the XML file. Thus, at a later date when the developer is trying to recall a particular project, the developer can identify the project based on the selected view of the project he captured as a screenshot, and his selection of the screenshot (e.g., from a group of screenshot files saved in the project catalog), can recall the project of which the screenshot was taken. The project can be accessed using the trace data that can lead allow the system to access the project file from its saved location. The location could be, for example, on one of the servers 112, on the client device 106, or on another client device 108 or 110, or in another location.

In embodiments, a user (including the same or a different user) working on the same client device 106 or a different client device 108 or 110 could be presented with a problem to be solved for a particular job request. The software developer working on client device 108 could remember that an earlier project had addressed the same or similar problem as the current problem the developer was trying to address. The software developer on client device 108 could access, over the network, one or more thumbnail files of screenshots of projects that had been saved via the project recall system 102, in a similar manner as described above. The software developer could browse through the thumbnails until he identifies the appropriate project, based on the configuration details as portrayed in the screenshot. The developer could then select the screenshot, and the project recall system 102, using the trace data associated with the screenshot in the XML file, could recall the project for the software developer, on the client device 108. In recalling the project, the details of the project, as well as the configurations within the IDE of the particular workspace could be recalled as well.

Figure 2:
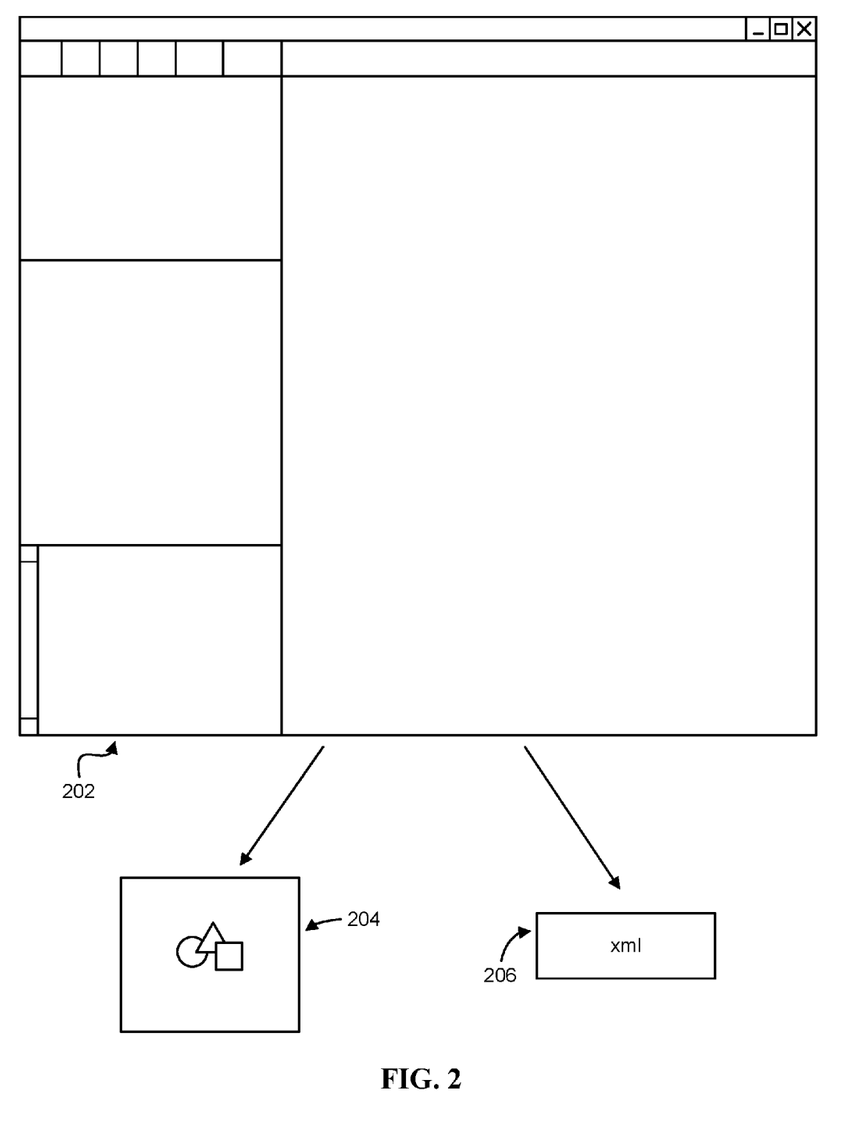
FIG. 2 depicts an example view of a screenshot and associated files, according to embodiments.

FIG. 2 depicts an example view of a screenshot and associated files, according to embodiments. In embodiments, a software developer may request to capture a screenshot when working on a particular project within an IDE environment, or the screenshot may be captured automatically (rather than manually) based on user settings. If the developer is working on a project which has a user interface (e.g., a web project or a portlet project), the IDE may provide a visual representation of the user interface in an editor view. The developer may choose to leverage this UI view for mapping to the project. The screenshot 202 depicted illustrates an example of this option, where the screenshot selected is of a UI of the project.

In other embodiments, the developer may be working on a project which does not have a user interface. In this case, the developer may choose to specify another view of his choice that may help him to visually identify a project. For example, the developer may choose to capture a screenshot of a class diagram or a web flow diagram. In other embodiments, user-editable default settings may dictate which artifacts are captured in a particular screenshot view for the project. In either instance, whether a developer is working on a project with or without a UI view of the project, a screenshot may be captured by the system (for example, project recall system 102 of FIG. 1). Other potentially unique attributes to the project that could play a role in recalling the project in the future and could be captured include user interface design, project hierarchical structure, main class outline, outcome or result, reported error, execution logs, thrown exceptions, or others.

An IDE environment may provide a development environment that has a concept of views to display various project information. For example, a project hierarchy may be shown via a project explorer or enterprise explorer view. In another example, an outcome or result may be visible in a browser or console view. A UI design may be able to be captured via screenshot in a page designer or rich page editor view, compile time errors may be visible in a problems view or marker view, runtime exceptions may be visible in an error log view, and execution logs may be visible in a console view.

In response to the screenshot request and capture, the system may create a thumbnail of the screenshot 204. This thumbnail can be saved in a project catalog folder, or in another location as specified by a user, with other similarly created thumbnails to be browsed by a developer who is later trying to recall the project. In some instances, the screenshot may be the first capture of the particular project within a specified period of time. In this case, a trace data entry within XML file 206 will also be created in response to the capture of the screenshot 202. As described herein, the trace data entry stored within the XML file 206 may contain mapping information that can be used later to trace back to the workspace location and launch the project. This information may include screen shot name, corresponding project name, and a complete workspace path. The location of the XML file may be determined by a default setting, or it may be specified by the user. In embodiments, a single XML file containing trace data may exist within a particular system. The XML file may contain the trace data for all the screen shots within a system. In embodiments, there can be multiple screenshots for the same project, and different projects for one workspace or for multiple workspaces. However, the trace data for each of these can be stored and updated in a single XML file.

Figure 3:
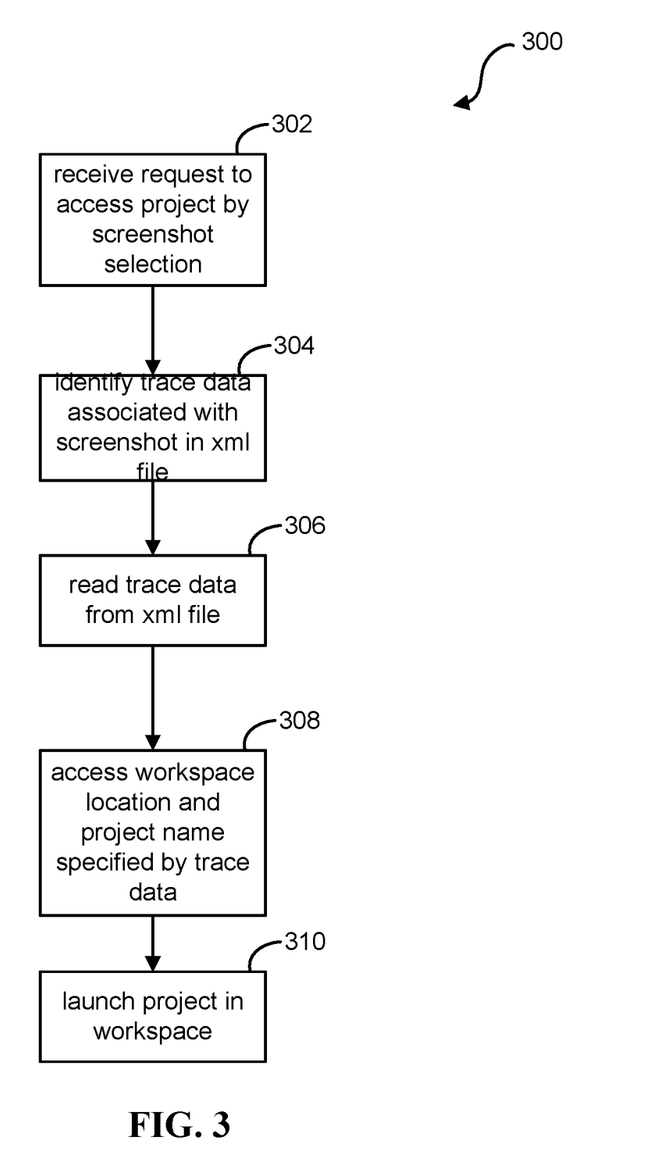
FIG. 3 depicts a flow diagram of a method for recalling a project, according to embodiments.

FIG. 3 depicts a flow diagram of a method 300 for recalling a project, according to embodiment. The method may begin when a request is received to access a project by a selection of a particular screenshot associated with the project, per 302. In embodiments, the request may be initiated on a client device (e.g., client device 106 of FIG. 1), and based on a particular thumbnail file of the screenshot, as viewed by a user (e.g., a software developer) working on the client device. The request may be fulfilled by a system (e.g., project recall system 102 of FIG. 1) identifying the trace data associated with the particular screenshot, where the trace data is stored in the XML file, per 304. As discussed in more detail herein, the associated trace data in the XML file may have been created by the system (e.g., project recall system 102 of FIG. 1), in response to the initial capture of the screenshot or screenshots. Trace data from the XML file can then be read, per 306. Using the trace data, including, for example, location data, the system can access the particular workspace location and project name specified by the trace data, per 308. The system may then launch the recalled projects within the workspace in the IDE, per 310.

Figure 4:
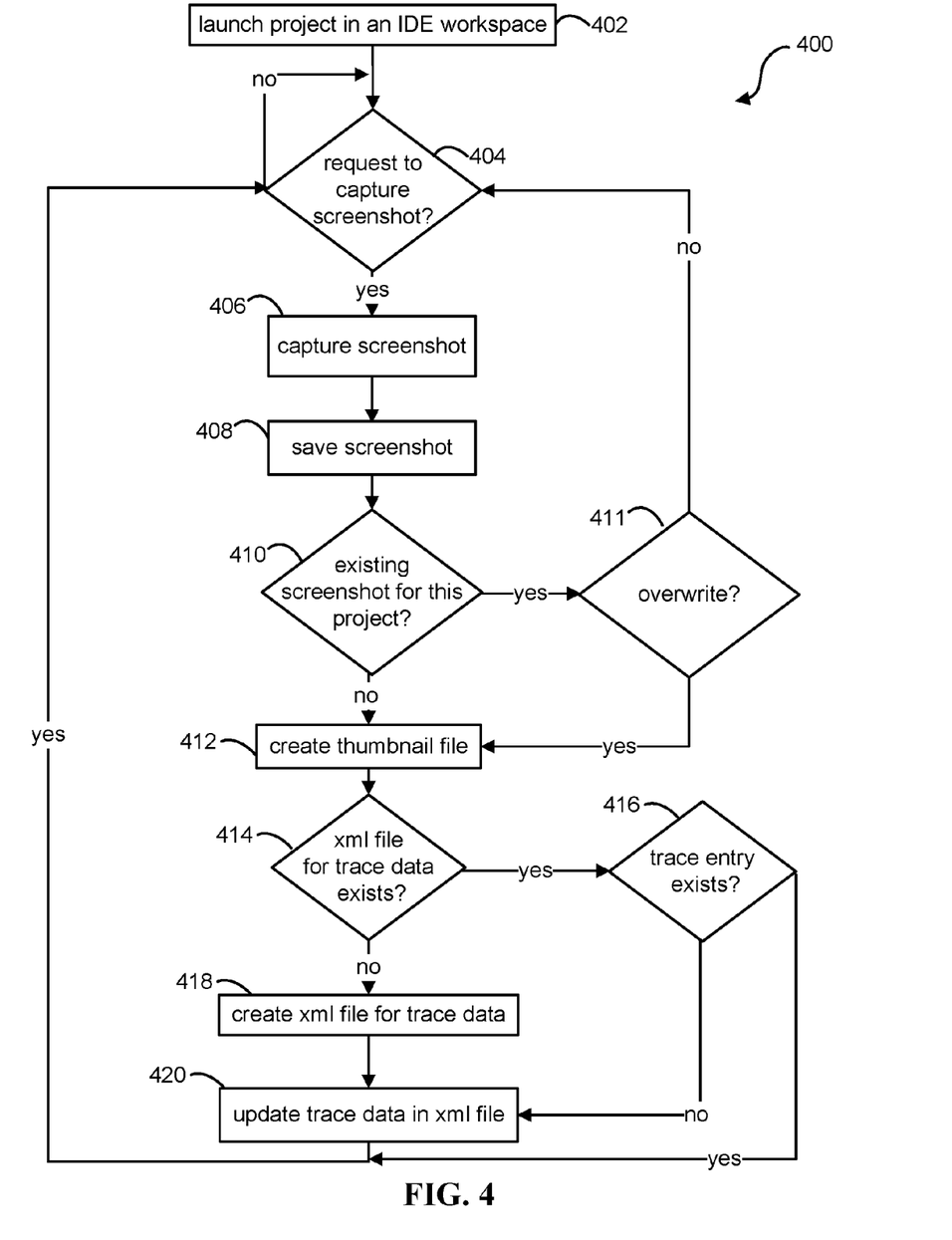
FIG. 4 depicts an example method for capturing and recalling projects in an IDE, according to embodiments.

FIG. 4 depicts an example method 400 for capturing screenshots and using them in recalling projects in an IDE, according to embodiments. In embodiments, the method may begin when a project is launched within an IDE workspace, per 402. This project could be a new project a developer is working on, or it could be an existing project that was saved previously. At a particular point in working in the project, a developer may wish to capture a screenshot, as discussed herein. In embodiments, this capture may occur automatically, for example, tied to a project save or at particular time or progress intervals. The system may then determine if a request to capture the screenshot is received, per 404. If no request is received, the system may return to waiting for the request, among other tasks. Upon receipt of a screenshot capture request, the system may capture the screenshot, per 406. The system may then save the screenshot, per 408. Upon saving the screenshot, a determination may be made as to whether or not the saved screenshot is of a project for which a screenshot has already been captured and saved by the system (e.g., project recall system 102 of FIG. 1), per 410.

If the screenshot is a first or new screenshot for the project, then a thumbnail file of the screenshot may be created, per 412. In embodiments, a thumbnail file may be created for each screenshot regardless of the existence of one or more other screenshots for the project. In embodiments, if at 410 the system determines that there are one or more existing screenshots for the project, the system may then overwrite the old screenshot file, per 411. In embodiments, this could occur as a default option, in others it could be a user or system administrator controlled setting, and in still others, the option to overwrite an old screenshot with the new one may present to a user as a prompt upon saving. If at 411 the system does not overwrite the screenshot, the system may return to monitoring for additional screenshot capture requests.

If at 411, the system overwrites the screenshot, a new thumbnail file may be created, per 412. The system may then determine if an XML file for holding the trace data exists, per 414. If an XML file for the system already exists, at 414, the system can determine if the particular trace entry exists, per 416. In embodiments, a particular trace entry may be the set of trace data associated with the particular screenshot, which may be stored and later used to access the project in its workspace. If the trace entry does not exist in the XML file at 416, the system may update the trace data within the XML file to reflect the new screenshot, per 420. In some cases, a trace entry may already exist for the particular screenshot of the project configuration, at 416, and so no trace data update would be required. The system may then return to monitoring for a screenshot capture request, per 404.

In some cases, an XML file for trace data may not exist within the system, at 414. In this case, the system may create an XML file for trace data, per 418. In embodiments, a single XML file may be used to store a number of trace data entries, to be used by the system to later recall particular projects. Once an XML file has been created for trace data, the system can update the trace data within the XML file to add the particular trace data entry, per 420. The system can then return to monitoring for additional screenshot capture requests.

In embodiments, a request to access a particular project, via the associated screenshot, may come from a client device (e.g., client device 106 of FIG. 1), in response to a developer making a selection based off of, for example, browsing a number of thumbnail files of screenshots saved previously. Based on the requested screenshot as well as an associated trace data in the XML file, the project associated with the screenshot may be accessed and launched within a particular workspace. In embodiments, the project may be launched as detailed by the method of FIG. 3.

Figure 5:
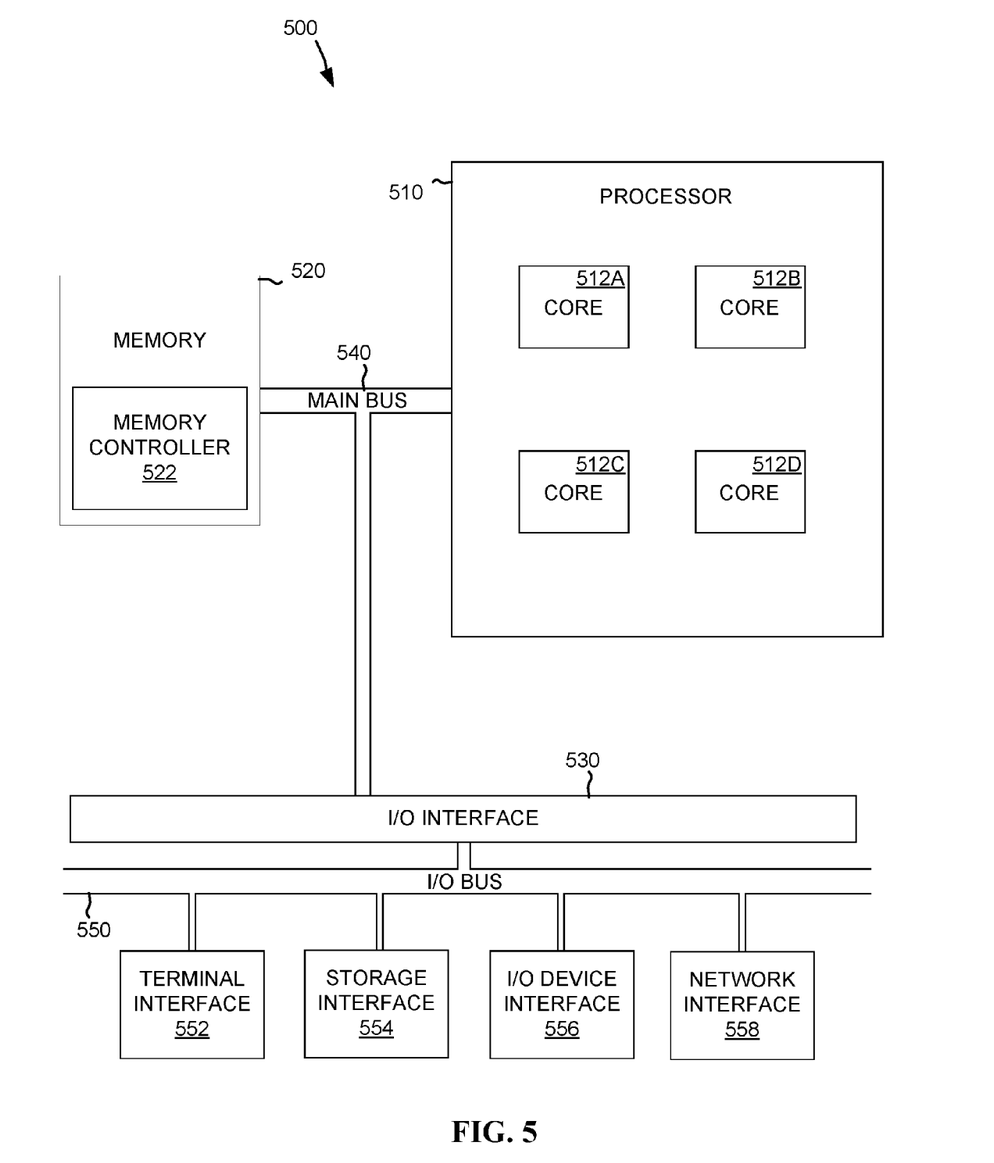
FIG. 5 depicts an example of a computer system for capturing and recalling projects, according to embodiments.

FIG. 5 depicts the representative major components of an example computer system 500 that may be used, according to embodiments. For example, computer system 500 may be project recall system 102 of FIG. 1. It is appreciated that individual components may vary in complexity, number, type, and\or configuration. The particular examples disclosed are for example purposes only and are not necessarily the only such variations. The computer system 500 may comprise a processor 510, memory 520, an input/output interface (herein I/O or I/O interface) 530, and a main bus 540. The main bus 540 may provide communication pathways for the other components of the computer system 500. In some embodiments, the main bus 540 may connect to other components such as a specialized digital signal processor (not depicted).

The processor 510 of the computer system 500 may be comprised of one or more cores 512A, 512B, 512C, 512D (collectively 512). The processor 510 may additionally include one or more memory buffers or caches (not depicted) that provide temporary storage of instructions and data for the cores 512. The cores 512 may perform instructions on input provided from the caches or from the memory 520 and output the result to caches or the memory. The cores 512 may be comprised of one or more circuits configured to perform one or methods consistent with embodiments of the present disclosure. In some embodiments, the computer system 500 may contain multiple processors 510. In some embodiments, the computer system 500 may be a single processor 510 with a singular core 512.

The memory 520 of the computer system 501 may include a memory controller 522. In some embodiments, the memory 520 may comprise a random-access semiconductor memory, storage device, or storage medium (either volatile or non-volatile) for storing data and programs. In some embodiments, the memory may be in the form of modules (e.g., dual in-line memory modules). The memory controller 522 may communicate with the processor 510, facilitating storage and retrieval of information in the memory 520. The memory controller 522 may communicate with the I/O interface 530, facilitating storage and retrieval of input or output in the memory 520. The memory 520 may contain instructions that are executable by processors 510 to perform methods including methods 300 and 400, as described in FIGS. 3 and 4, respectively.

The I/O interface 530 may comprise an I/O bus 550, a terminal interface 552, a storage interface 554, an I/O device interface 556, and a network interface 558. The I/O interface 530 may connect the main bus 540 to the I/O bus 550. The I/O interface 530 may direct instructions and data from the processor 510 and memory 520 to the various interfaces of the I/O bus 550. The I/O interface 530 may also direct instructions and data from the various interfaces of the I/O bus 550 to the processor 510 and memory 520. The various interfaces may include the terminal interface 552, the storage interface 554, the I/O device interface 556, and the network interface 558. In some embodiments, the various interfaces may include a subset of the aforementioned interfaces (e.g., an embedded computer system in an industrial application may not include the terminal interface 552 and the storage interface 554). In embodiments, storage interface 554 may be used to access one or more data repositories, including for example, data repositories stored on a server, for example server 112 of FIG. 1, or storage within a client device, for example client device 106.

Logic modules throughout the computer system 500—including but not limited to the memory 520, the processor 510, and the I/O interface 530—may communicate failures and changes to one or more components to a hypervisor or operating system (not depicted). The hypervisor or the operating system may allocate the various resources available in the computer system 500 and track the location of data in memory 520 and of processes assigned to various cores 512. In embodiments that combine or rearrange elements, aspects and capabilities of the logic modules may be combined or redistributed. These variations would be apparent to one skilled in the art.

A use case of a particular embodiment may be helpful to illustrate the utility of the disclosed. In one example, a software developer may be working in a web project, where the web project provides a UI that could be captured by a screenshot. A UI of any project would be a way to recall the project. An IDE may provide several editors and views which allow the project's artifacts and the project's behavior to be checked. The UI may also provide a view to see a preview or design of the web page (e.g., page designer or rich page editor). In this example, default settings may exist for the workspace preferences (e.g., to be captured), and the user can modify the settings based on preference. These settings may include: automatic versus manual screen capture; a location for saving the captured screenshots including a project catalog folder or another folder; the XML file settings for trace data, including a default or other path for the trace data in the XML file; and a screenshot naming system, including a default combination of project name and selected view, a prompt to the user to specify a name based on the save, or another system; and an option to overwrite a screenshot, including saving multiple or replacing screenshots upon capture of additional views for the same project.

In this example, once a user has created a web project and begun working on the UI design in, for example, page designer, the user may wish to save the changes to the UI design. The project may be saved as normal, and the save may trigger a capture of the screen shot of the design view with the details of the selected project and current workspace. The screenshot may then be maintained in a folder named "project catalog" and the screenshot's name, associated project name, and workspace path can be maintained in trace data within an XML file. In some embodiments, when a developer makes changes to the project and saves the changes, a new screenshot will be captured and the screenshot on file will be replaced with the new one (i.e., updated).

In another example, a developer may have created a model servlet class, a good Java bean, or a web xml with specific settings, which the developer would like to save for future recall. However, these items may not have a UI, but the settings and/or artifacts may still be useful for future projects. In this situation, utilizing the fact that the IDE provides different views of different project artifacts and allows the values and states of these artifacts to be checked, the system can provide you with the option to map your project with those views, based on the preferences and selections of the developer. For example, if a developer wishes to map a project with a web xml, the screenshot of the view can be automatically captured and updated, according to user settings.

In another example, if a developer chooses to manually capture the screenshot, then a "capture" button may appear in the workspace to capture the screenshot. By selecting the "capture" button, the developer can choose which portion of the workspace he wishes to capture, based on what will help him recall the project in the future. For example, this could be a single view screenshot or a combination of multiple views.

Later, a developer may receive a project to work on that is very similar, in part or in whole, to a project he worked on previously, and for which he used the system to capture screenshots for the project, as described above. In this case, the developer may wish to recall that previous project. This may be done by selecting an "open catalog" button within the IDE. The project catalog folder may open in response, and the developer can navigate through thumbnails of the screenshots. In this particular use case, two screenshots may be saved for a single project. The developer can choose either one to recall the project. For example, if the developer is looking for a web xml with specific settings, the web xml screenshot may be helpful in identifying the project to recall. However, if the developer planning to create a web project based on a UI that is similar to one captured previously, the screenshot of the design view of the project may be more helpful than the web xml view.

Once the screenshot has been selected by the developer, the workspace path may be opened via the workspace launcher dialog. The developer can select an "ok" button, and the workspace launcher dialog can launch the workspace and select the particular project contained within that screenshot. While the above examples are illustrations of a particular use case, the disclosed may be applicable to other types of projects as well (e.g., not just web projects).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    receiving, from an I/O device, a selection of artifacts associated with a project, the selection of artifacts comprising a source code;
    capturing the selection of artifacts associated with the project as a particular screenshot;
    saving the particular screenshot;
    creating, in response to the saving, trace data, the trace data being stored in an extensible markup language XML file;
    receiving a request to access the project by a selection of the particular screenshot of the project from a set of screenshots, the particular screenshot of the project captured in response to a developer selection, and the particular screenshot is a file mapped to a particular workspace location and associated with the trace data stored in the XML file, the XML file is separated from the file for the particular screenshot;

identifying in response to the request, the trace data associated with the particular screenshot in the XML file wherein the trace data comprises location data, wherein the location data is used by the system to access a particular workspace from the particular workspace location in memory;

reading, from the XML file, the trace data associated with the particular screenshot;

accessing, from the workspace location specified by the trace data, an IDE (Integrated Development Environment) workspace associated with the screenshot, the IDE workspace is separated from the file for the particular screenshot and from the XML file; and launching the IDE workspace accessed using the trace data associated with the particular screenshot, the IDE workspace containing the project.

2. The method of claim 1, wherein the saving the particular screenshot occurs in conjunction with a saving operation for the IDE workspace.

3. The method of claim 1, further comprising creating a thumbnail view of the particular screenshot, the thumbnail view associated with the trace data in the XML file.

4. The method of claim 1, wherein the selection of artifacts further comprises a source class and deployment descriptor files.

5. The method of claim 1, wherein the trace data comprises:

a set of one or more names of a group of screenshots associated with the project, including the particular screenshot;

a project name, the project name corresponding to the name of the project and to the particular screenshot; and the particular workspace location.

6. A system comprising:

a computer readable storage medium with program instructions stored thereon; and one or more processors configured to execute the program instructions to perform a method comprising:

receiving, from an I/O device, a selection of artifacts associated with a project, the selection of artifacts comprising a source code;

capturing the selection of artifacts associated with the project as a particular screenshot;

saving the particular screenshot;

creating, in response to the saving, trace data, the trace data being stored in an extensible markup language XML file;

receiving a request to access the project by a selection of the particular screenshot of the project from a set of screenshots, the particular screenshot of the project captured in response to a developer selection, and the particular screenshot is a file mapped to a particular workspace location and associated with trace data stored in the XML file, the XML file is separated from the file for the particular screenshot;

identifying in response to the request, the trace data associated with the particular screenshot in the XML file wherein the trace data comprises location data, wherein the location data is used by the system to access a particular workspace from the particular workspace location in memory;

reading, from the XML file, the trace data associated with the particular screenshot;

accessing, from the workspace location specified by the trace data, an IDE (Integrated Development Environment) workspace associated with the screenshot; and launching the IDE workspace accessed using the trace data associated with the particular screenshot, the IDE workspace containing the project.

7. The system of claim 6, wherein the saving the particular screenshot occurs in conjunction with a saving operation for the IDE workspace.

8. The system of claim 6, wherein the method further comprises creating a thumbnail view of the particular screenshot, the thumbnail view associated with the trace data in the XML file.

9. The system of claim 6, wherein the selection of artifacts further comprises a source class and deployment descriptor files.

10. The system of claim 6, wherein the trace data comprises:

a set of one or more names of a group of screenshots associated with the project, including the particular screenshot;

a project name, the project name corresponding to the name of the project and to the particular screenshot; and the particular workspace location.

11. A computer program product comprising a compute readable storage medium having program instructions embodied therewith, wherein the computer readable storage medium is not a transitory signal per se, the program instructions executable by a computer processor to cause the processor to perform a method comprising:

receiving, from an I/O device, a selection of artifacts associated with a project, the selection of artifacts comprising a source code;

capturing the selection of artifacts associated with the project as a particular screenshot;

saving the particular screenshot;

creating, in response to the saving, trace data, the trace data being stored in an extensible markup language (XML) file;

receiving a request to access a project by a selection of a particular screenshot of the project from a set of screenshots, the particular screenshot of the project captured in response to a developer selection, and the particular screenshot is a file mapped to a particular workspace location and associated with the trace data stored in the XML file, the XML file is separated from the file for the particular screenshot;

identifying in response to the request, the trace data associated with the particular screenshot in the XML file wherein the trace data comprises location data, wherein the location data is used by the system to access the particular workspace from the particular workspace location in memory;

reading, from the XML file, the trace data associated with the particular screenshot;

accessing, from the workspace location specified by the trace data, an IDE (Integrated Development Environment) workspace associated with the screenshot; and launching the IDE workspace accessed using the trace data associated with the particular screenshot, the IDE workspace containing the project.

12. The computer program product of claim 11, wherein the saving the particular screenshot occurs in conjunction with a saving operation for the IDE workspace.

13. The computer program product of claim 11, wherein the method further comprises creating a thumbnail view of the particular screenshot, the thumbnail view associated with the trace data in the XML file.

14. The computer program product of claim 11, wherein the selection of artifacts further comprises a source class and deployment descriptor files.

15. The computer program product of claim 11, wherein the trace data comprises:
- a set of one or more names of a group of screenshots associated with the project, including the particular screenshot;
- a project name, the project name corresponding to the name of the project and to the particular screenshot; and
- the particular workspace location.

\* \* \* \* \*